June 19, 1934.   J. A. SPENCER   1,963,633
THERMOSTATIC VALVE
Filed Dec. 6, 1930   2 Sheets-Sheet 1
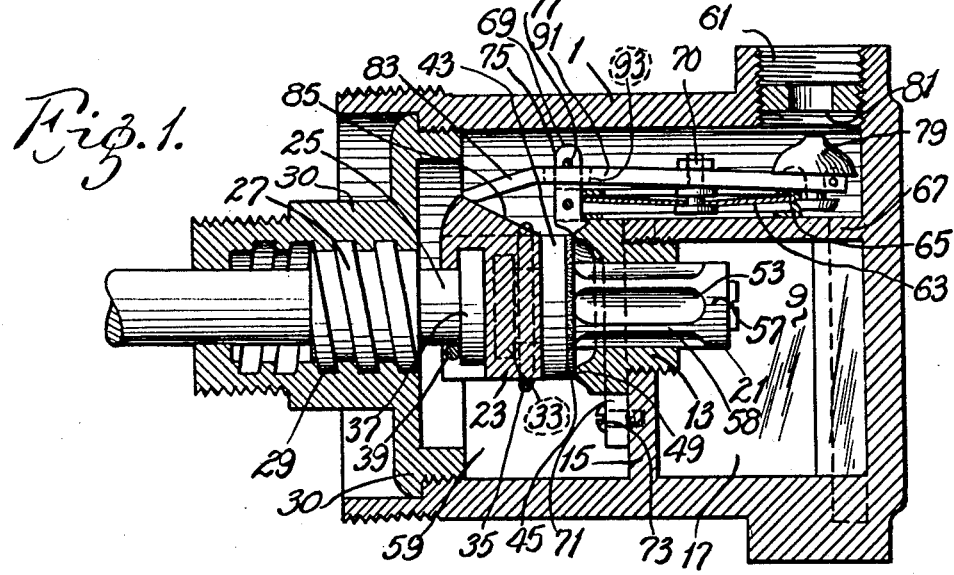
Fig. 1.
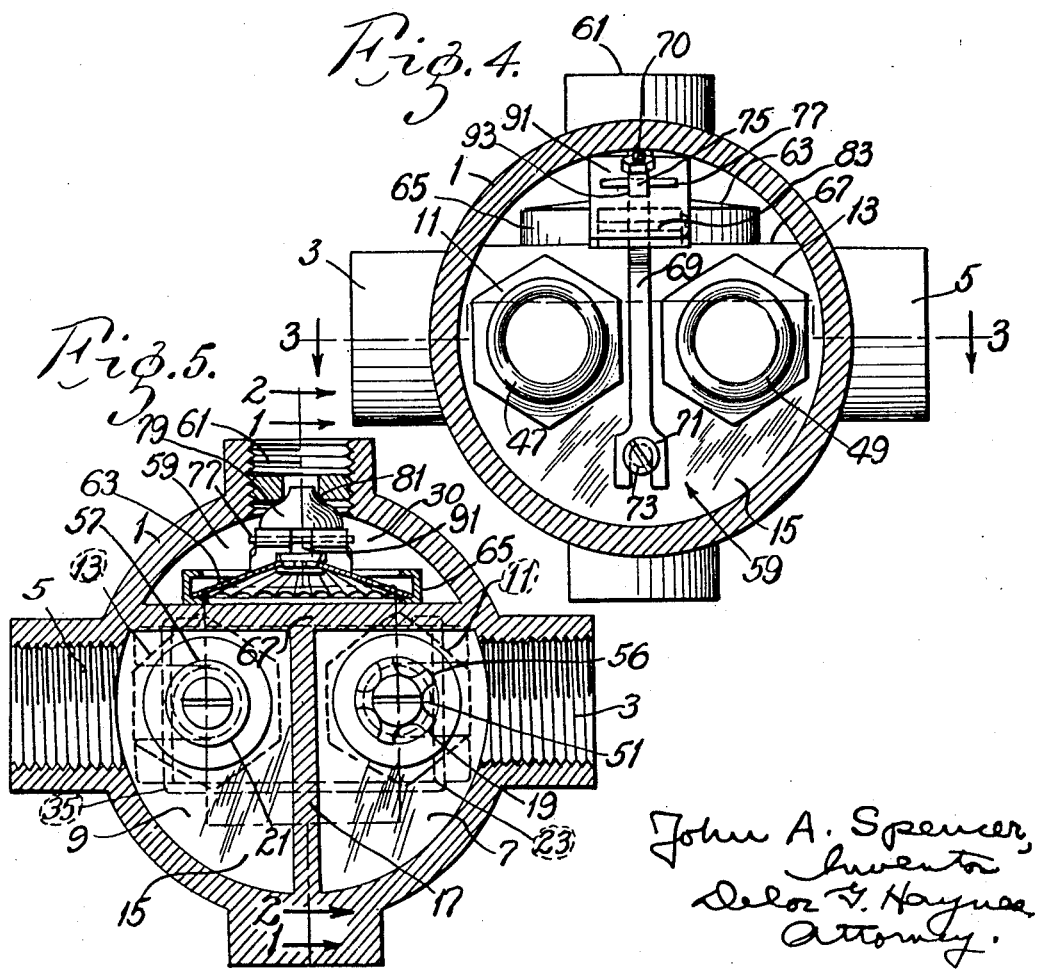
Fig. 4.
Fig. 5.
John A. Spencer, Inventor
Delos F. Haynes, Attorney.

June 19, 1934.   J. A. SPENCER   1,963,633
THERMOSTATIC VALVE
Filed Dec. 6, 1930   2 Sheets-Sheet 2

John A. Spencer,
Inventor.
Delos G. Haynes
Attorney.

Patented June 19, 1934

1,963,633

UNITED STATES PATENT OFFICE 1,963,633

THERMOSTATIC VALVE

John A. Spencer, Newtonville, Mass., assignor to Spencer Thermostat Company, Cambridge, Mass., a corporation of Massachusetts Application December 6, 1930, Serial No. 500,488

11 Claims. (Cl. 277—7)

This invention relates to valves, and with regard to certain more specific features, to mixing valves adapted for use in showers.

Among the several objects of the invention may be noted the provision of a valve having therein a thermostat which automatically actuates a safety valve when the water flowing therethrough reaches a predetermined temperature; the provision of a valve of the class described which is adapted to receive hot and cold water and deliver water at a variable temperature ranging from the temperature of the cold water to the temperature of the hot water; the provision of a thermostatically controlled valve of the class described which, when automatically closed by the thermostat, must be manually opened before the valve is again operative, thereby providing an added safety feature; and the provision of a valve of the class described which is simple, positive in operation, and easily adapted to a variety of uses. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a vertical section of a mixing valve provided with a thermostatically actuated cut-off, and is taken substantially along line 1—1 of Fig. 5;

Fig. 4 is a cross-section taken substantially along line 4—4 of Fig. 2; and,

Fig. 5 is a cross-section of the valve taken substantially along line 5—5 of Figs. 2 and 3.

Similar reference characters indicate corresponding parts throughout the several views of the drawings.

Figure 3:
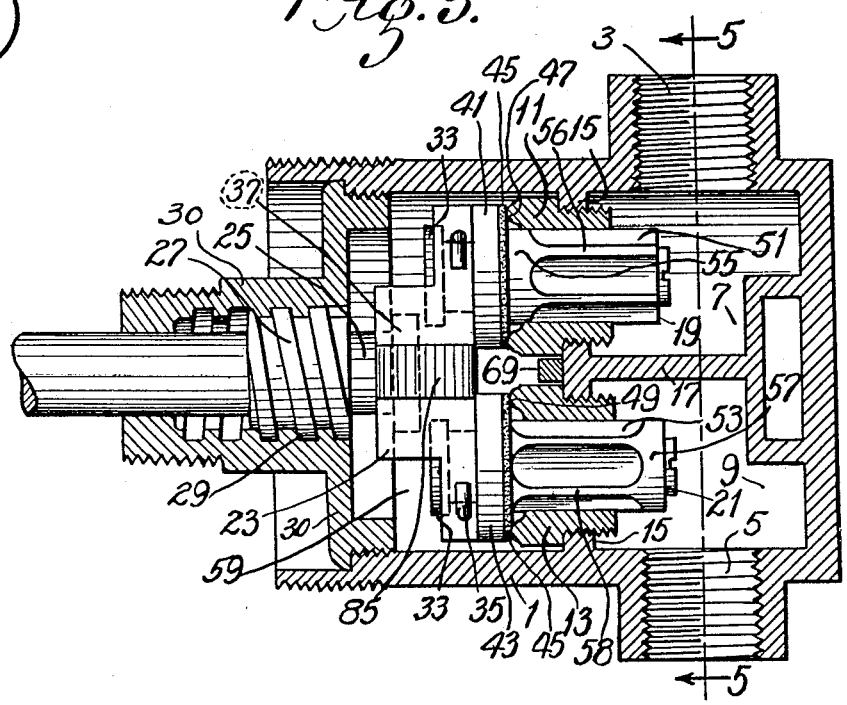
Fig. 3 is a horizontal section taken substantially along line 3—3 of Fig. 4.

Referring now to the drawings, and more particularly to Figs. 1 and 3, there is shown at numeral 1 a valve casing having a hot water inlet 3 and a cold water inlet 5, communicating within the casing 1 with hot and cold chambers 7 and 9, respectively. The chambers 7 and 9 are provided with outlet bushings 11 and 13, respectively, which are screwed into the rear wall portion 15 of each of the chambers 7 and 9. A partition wall 17 defines in part the chambers 7 and 9.

Valve members 19 and 21 are received within the bushings 11 and 13, respectively, and are carried by a cross-head 23. The cross-head 23 is mounted on a stem 25 provided with screw threads 27 engaging with an internally threaded portion 29 of a plug 30, the latter serving as a closing member for one end of the casing 1 and as a bearing for the stem 25. A handle 31 is provided on the stem 25 for opening or closing the valve members 19 and 21.

The valve members 19 and 21 and the shaft 25 are each rotatably connected with the cross-piece 23. The valve members 19 and 21 are each provided with a collar portion 33 and are rotatably held within the cross-piece 23 by means of a retaining wire 35. The shaft 25 is likewise provided with a collar 37 and is rotatably held within the cross-piece 23 by means of a retaining wire 39 (see Fig. 2). It is thus clear that as the handle 31 is turned the shaft 25 is free to turn so as to advance or retract the valve members 19 and 21 with respect to the bushings 11 and 13.

The valve members 19 and 21 are provided with heads 41 and 43, respectively, each of which is faced with a rubber or like covering 45 which is adapted to form a tight seat when the valves are seated on the peripheral valve seats 47 and 49 formed on the bushings 11 and 13, respectively. Each of the valve members is also provided with grooves along its outer face, the grooves 51 on valve 19 extending from the outer extremity of said valve to a short distance from its inner extremity, and the grooves 53 on valve 21 extending from its inner extremity to a short distance from its outer extremity. It will be noted that this method of cutting grooves on the valve members provides cylindrical ungrooved portions 55 and 57 on the valve members 19 and 21, respectively. Guides 56 and 58 extend from the cylindrical portions 55 and 57.

Assuming that the valves 19 and 21 are both seated and in a fully closed position as shown in Fig. 3, it will be clear that as the handle 31 is turned counterclockwise to open said valves, at first only cold water is permitted to enter the mixing chamber 59, inasmuch as the cylindrical ungrooved portion 55 of valve member 19 prevents hot water from passing through the valve. The cold water entering the inlet 5, passes through the grooves 53 and valve member 21, and then into the mixing chamber 59. Further turning of the handle 31 removes the cylindrical portion of valve 19 from the bushing 11 and permits hot water to enter the mixing chamber 59 through the inlet 3 and groves 51, there to be mixed with the cold water which is coming from the inlet 5. As the handle is turned still further, there is admitted to the mixing chamber 59 more of both hot and cold water until the cylindrical portion 57 of valve member 21 enters the bushing 13 so as to throttle the flow of cold water into the chamber 59, after which time only hot water enters this chamber. It will be seen that in passing from the completely closed to the completely open position of the valve, that the water entering the mixing chamber 59 varies from completely cold water through a varying mixture of hot and cold water to completely hot water, the flow of cold water being gradually throttled as the flow of hot water is increased. The water entering the mixing chamber 59 passes through an outlet 61 which communicates with a shower head or the like (not shown).

In the passage between the mixing chamber 59 and the outlet 61 there is provided a thermostatic device 63 which is adapted to cut off the flow of water from the outlet 61 when the temperature of this water reaches a predetermined limit, so as to protect a bather from being scalded, for example. The thermostatic element 63 is preferably of a type which has a relatively large throw at its center and may conveniently be of the type described in my co-pending United States application, Serial No. 463,961, filed June 26, 1930, now Patent No. 1,895,590, entitled "Snap-acting device." This thermostatic element 63, which may thus be in the general form of a radially corrugated and slightly conical disk, is mounted within a flanged ring 65 which is supported on a shelf 67 comprising the upper wall of the chambers 7 and 9. Pivotally mounted on one side of the ring 65 is an arm 69 which is forked at its lower end, as represented by numeral 71 (see Fig. 4), and held to the wall 15 by means of a bolt 73. To the center of the thermostatic element 63 there is attached, as shown at numeral 70, a lever 91. The lever 91 is provided with a longitudinal slot 93 which permits the free end 75 of the arm 69 to project therethrough. The lever 71 is retained in assembled fulcrumed relation with the arm 69 by means of a cross pin 77. One end of the lever 71 carries a valve closing member 79 which, by the action of the thermostatic disk 63, is forced up against a valve seat 81 provided in the outlet passage 61. The end of the lever 71 near the arm 69 is bent as at numeral 83 to engage a cam surface 85 provided on the cross-head 23.

The operation of the thermostatic device is as follows:

The valves 19 and 21 being in their fully closed positions, the cam 85 is in full engagement with the end 83 of the lever 91, thereby placing the thermostat in the position shown in Fig. 1, that is with the thermostatic member 63 in a depressed or cold position and the valve 79 removed from its seat 81. When the handle 31 is turned to permit water to pass from the outlet 61, the thermostatic device remains in the open position shown in Fig. 1 until the water reaches a temperature which is sufficient to cause the thermostatic disk to snap to its hot position (Fig. 2) and seat the valve member 79 on its seat 81, thereby shutting off the flow of water from the outlet 61. It will be noted that as the handle 31 is turned to open the valves, the cam 85 is removed from engagement with the portion 83 of the lever 91, so that by the time the handle has been turned sufficiently far to permit hot water to pass from the mixing chamber 59, there is sufficient clearance between the cam 85 and the portion 83 to permit movement of the lever 91 sufficiently to seat the valve 79.

After the thermostat has operated to shut off the hot water, the handle 31 is turned so that the valves 19 and 21 are both seated. It will be noted that this closing of the valves manually resets the thermostat in its normally set cold or open, overcentered position, this being done by means of the cam 85 and the turned-down portion 83. As the handle 31 is turned to seat the valves 19 and 21 a quantity of cold water reaches the thermostat, because the flow of hot water is cut off before the flow of cold water, and meanwhile the thermostat has been forcibly reset by the cam 85. The cold water lowers the temperature of the thermostat sufficiently to cause it to remain in its normal cold or open, overcentered position when the handle 31 is again turned to start an opening of the valves 19 and 21.

A thermostatic member which will snap in one direction only in response to temperature variations provides a device which has an added safety feature inasmuch as the thermostatically operated valve must be manually reset each time after it operates. This manual resetting of the thermostatic valve is accompanied by a closing of both the valves 19 and 21 thereby shutting off the supply water to the shower. Thus, danger of water issuing from the shower until the handle 31 is again turned to start a flow of water is minimized.

Figure 2:
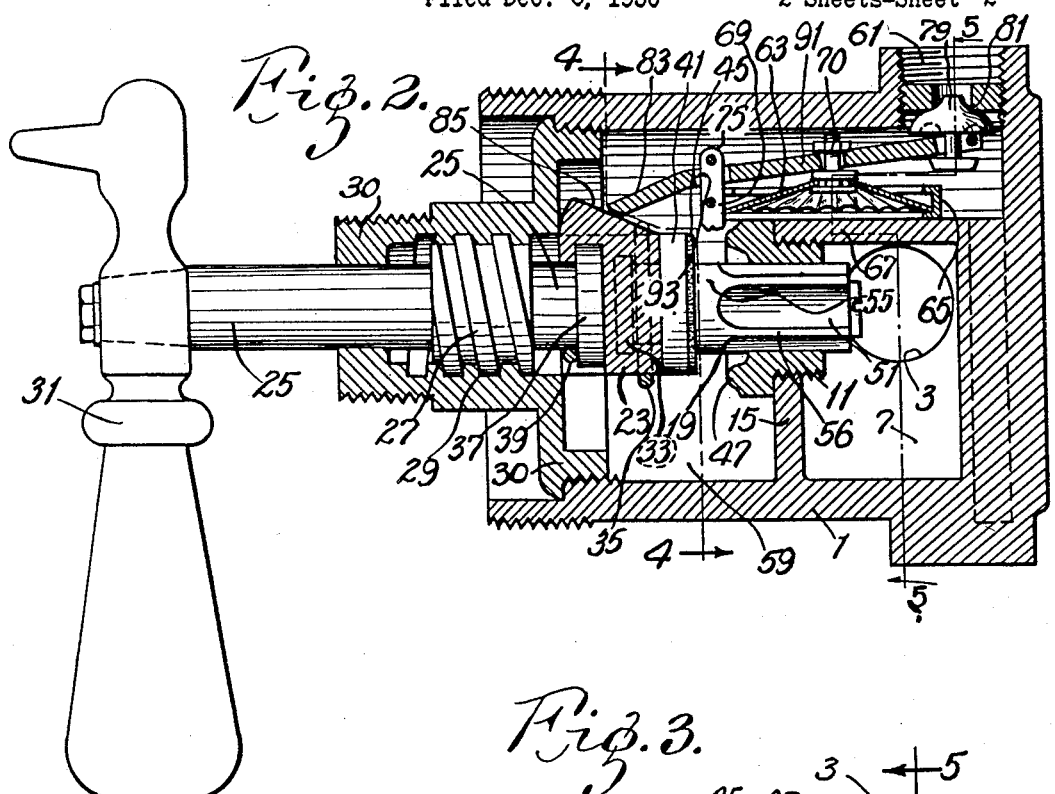
Fig. 2 is a vertical section taken substantially along line 2—2 of Fig. 5.

Several forms of thermostats may be used which are responsive in only one direction to temperature changes. For example, the thermostatic disk may be shaped as shown, with the apex of the cone, when in the hot position, substantially more distant from a plane including the edges of the disk than when the disk is in the cold position. Comparison of Figs. 1 and 2 shows such conditions to be true in the thermostat therein shown. The temperature at which the disk snaps from its cold to its hot position may therefore easily be within the desired temperature range of the water issuing from the valve inasmuch as the stresses set up in the disk due to temperature changes do not have to be comparatively large to effect a reversal of curvature. However, when the disk is in its hot position (Fig. 2), it is clear that a much greater temperature change would be required to set up stresses within the disk sufficient to effect a reversal of curvature. If the necessary temperature change is made sufficiently great, the temperature at which the disk would snap to its cold position is outside of the practical temperature range of the valve. It is thus necessary to manually apply a force to effect a snapping to the cold position.

An alternative type of thermostat which is responsive to temperature changes in one direction only comprises forming and using the ring 65 and the disk 63 as a thermostatic combination such as disclosed in my United States application, Serial No. 480,453, filed September 8, 1930 for "Thermostat". It is to be understood that the disk or member 63 may also be corrugated as pointed out hereinbefore. When using the ring 65 and disk 63 in combination, the disk is so constructed that it always tends to assume the hot position and the size of the ring 65 is made such that when the disk is manually pressed to its cold position the ring will hold the disk in this cold position for all temperatures below the temperature at which it is desired that the device operate to close the cut-off valve. The diameter of the ring 65 then expands more in response to temperature changes than does the disk 63. With the disk initially in its cold position, increasing temperatures cause the ring 65 to expand more than the disk until a temperature is reached at which the retaining effect of the ring on the disk is sufficiently reduced to permit the disk to snap to its normal or hot position. When in this hot position, it is clear that subsequent decreases in temperature effect a greater shrinkage in the ring than in the disk and that even if the disk were responsive to temperature changes in both directions it would not reverse its curvature, the difference in extent of shrinkages being sufficiently great.

It is to be understood that these suggested methods of providing a thermostat to effect the operation desired are exemplary only, and that many changes may be made and other methods used without departing from the scope of my invention.

It is clear that the thermostat may be set not to snap even upon full opening of the hot water valve (when the cold water valve is reclosed), that is, not until the temperature of said hot water per se exceeds a predetermined maximum. And if the temperature of the mixture exceeds said predetermined maximum the thermostat will react to close the safety valve. The thermostat responds to excess temperature of any fluid flowing to the outlet 61.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a device of the class described, a valve casing provided with separate cold fluid, hot fluid and fluid mixing chambers, inlets communicating with said cold fluid and hot fluid chambers and an outlet communicating with said mixing chamber, said cold fluid and hot fluid chambers being provided with ports communicating with said mixing chamber, valves adapted to regulate the flow of fluids through said ports, a thermostat interposed between said outlet and said mixing chamber, a cut-off valve adapted to be closed by said thermostat, said cut-off valve being placed in said outlet, and means for manually opening said cut-off valve.

2. In a device of the class described, a valve casing provided with separate cold fluid, hot fluid, and fluid mixing chambers, inlets communicating with said cold fluid and hot fluid chambers and an outlet communicating with said mixing chamber, said cold fluid and hot fluid chambers being provided with ports communicating with said mixing chamber, valves adapted to regulate the flow of fluids through said ports, control means for operating said valves, a thermostat interposed between said outlet and said mixing chamber, a cut-off valve adapted to be closed by said thermostat, said cut-off valve being placed in said outlet, and means for manually opening said cut-off valve, said last-named means being associated with said control means.

3. In a mixing valve, a plurality of valves adapted to regulate the temperature of the water flowing from said mixing valve, manual regulating means for simultaneously operating said valves, a cut-off valve in the outlet of said mixing valve, a thermostat arranged to operate said cut-off valve and means associated with said regulating means and with said thermostat for opening said cut-off valve when said regulating means is adjusted to close said plurality of valves.

4. In a mixing valve, a thermostatic cut-off valve assembly, comprising a snap-acting thermostatic member, a retaining means for said thermostatic member, a lever, said lever being fulcrumed within said mixing valve and affixed to said thermostatic member and a valve closing member, said member also being affixed to said lever.

5. In a mixing valve, a plurality of valves, a cross-head positioned to close said valves, a cam associated with said cross-head, and a thermostatic cut-off valve assembly comprising a snap-acting thermostatic member, and a lever affixed between its ends to said thermostatic member, a valve closing member affixed to one end of said lever, the other end of said lever engaging said cam.

6. A mixing valve comprising a body, manually operable controlling means which upon continuous movement first admits and passes therethrough only cold fluid, subsequently passes both cold and hot fluid, the rate of flow of cold fluid being gradually throttled as the flow of hot fluid is increased until the flow of cold fluid is entirely shut off, the flow of hot fluid above then continuing, means for mixing said fluids as they pass through the body, a valve for controlling the flow of mixed fluid from said body, and a thermostatic element positioned to be responsive to the temperature of said mixed fluid and to close said last-named valve at a predetermined temperature.

7. A mixing valve comprising a body, manually operable controlling means which upon continuous movement first admits and passes therethrough only cold fluid, subsequently passes both cold and hot fluid, the rate of flow of cold fluid being gradually throttled as the flow of hot fluid is increased until the flow of cold fluids is entirely shut off, the flow of hot fluid above then continuing, means for mixing said fluids as they pass through the body, a valve for controlling the flow of mixed fluid from said body, a thermostatic element positioned to be responsive to the temperature of said mixed fluid and to close said last-named valve at a predetermined temperature, and means associated with said controlling means for re-setting said thermostat and opening said last-named valve, said controlling means closing off the flow of hot and cold fluid substantially simultaneously but so that the flow of cold fluid is completely shut off last.

8. In a valve assembly, a cut-off valve, thermostatically operated means for closing said valve, manually operated re-setting means for opening said valve, and fluid mixing valves, said re-setting means closing said mixing valves as the cut-off valve is opened.

9. In a valve assembly, a cut-off valve, thermostatically operated means for closing said valve, manually operated re-setting means for opening said valve, hot and cold fluid mixing valves, said re-setting means closing said mixing valves as the cut-off valve is opened, and means associated with said mixing valves whereby the one conveying colder fluid is closed last.

10. In a fluid control assembly, a chamber, means admitting hot and cold fluid to said chamber, means mixing said hot and cold fluid, regulating means manually operable to predetermine the relative proportions of hot and cold fluid mixed, an outlet from said chamber for said mixed fluid, and safety means for said outlet comprising a thermostatic valve interposed therein adapted to close said outlet when the temperature of the mixed fluid exceeds a predetermined value, and means whereby said thermostatic valve is thereafter openable only upon readjustment of said regulating means.

11. In a fluid control assembly, means for mixing hot and cold fluids in adjustable proportions to achieve a mixed fluid of a desired temperature, a thermostatic safety valve controlling the flow of said mixed fluid and adapted to close and shut off the flow of said mixed fluid when its temperature exceeds a predetermined value, and means interconnecting said thermostatic valve and said mixing means whereby, after said thermostatic valve has been closed, it may be reopened only upon readjustment of the proportions of hot and cold fluid mixed.

JOHN A. SPENCER.